United States Patent
Wang et al.

(10) Patent No.: US 11,270,152 B2
(45) Date of Patent: Mar. 8, 2022

(54) METHOD AND APPARATUS FOR IMAGE DETECTION, PATTERNING CONTROL METHOD

(71) Applicant: BOE TECHNOLOGY GROUP CO., LTD., Beijing (CN)

(72) Inventors: Hong Wang, Beijing (CN); Zhaoyue Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 24 days.

(21) Appl. No.: 16/633,400

(22) PCT Filed: May 23, 2019

(86) PCT No.: PCT/CN2019/088146
§ 371 (c)(1),
(2) Date: Jan. 23, 2020

(87) PCT Pub. No.: WO2019/223763
PCT Pub. Date: Nov. 28, 2019

(65) Prior Publication Data
US 2021/0166060 A1    Jun. 3, 2021

(30) Foreign Application Priority Data

May 25, 2018   (CN) .................... 201810517710.X (51) Int. Cl.
*G06K 9/00*      (2006.01)
*G06K 9/62*      (2022.01)
(Continued)

(52) U.S. Cl.
CPC ........... *G06K 9/6202* (2013.01); *G06F 17/18* (2013.01); *G06K 9/36* (2013.01); *G06K 9/6232* (2013.01); *G06K 9/6261* (2013.01)

(58) Field of Classification Search
CPC ...... G06K 9/6202; G06K 9/6232; G06K 9/36; G06K 9/6261; G06K 9/6407;
(Continued)

(56) References Cited

U.S. PATENT DOCUMENTS 6,504,947 B1 *   1/2003   Nozaki ................... G06T 7/001
                                                        382/144
6,675,174 B1 *   1/2004   Bolle ................. G06K 9/00711
(Continued)

FOREIGN PATENT DOCUMENTS

CN    101149291 A    3/2008
CN    101751572 A    6/2010
(Continued)

OTHER PUBLICATIONS

International Search Report of PCT/CN2019/088146 in Chinese, dated Aug. 21, 2019, with English translation.
(Continued)

*Primary Examiner* — Amir Alavi
(74) *Attorney, Agent, or Firm* — Collard & Roe, P.C.

(57) ABSTRACT

The application provides an image detection method, an image detection apparatus, and a patterning control method, the image detection method including: identifying an input image to obtain image feature data of the input image; comparing the image feature data with preset image feature data in a preset image feature database to obtain deviation data of the input image; wherein the input image is a pattern image of a patterned structure. By intelligently detecting the pattern image of the patterned structure, the accuracy of the detection is improved, thereby reducing the labor input cost.

11 Claims, 5 Drawing Sheets

(51) Int. Cl.
*G06F 17/18* (2006.01)
*G06K 9/36* (2006.01)

(58) Field of Classification Search
CPC .. G06K 9/2009; G06K 9/6423; G06K 9/6476; G06K 9/00084; G06K 9/4609; G06T 7/001; G06T 7/0081; G06T 7/0083; G06F 17/30249; G06F 17/18; G11B 27/28
See application file for complete search history.

(56) References Cited

U.S. PATENT DOCUMENTS

| | | | | |
|---|---|---|---|---|
| 8,073,686 | B2* | 12/2011 | Kida | G10L 15/02 |
| | | | | 704/207 |
| 8,768,046 | B2* | 7/2014 | Ernst | G06T 7/251 |
| | | | | 382/154 |
| 10,264,237 | B2* | 4/2019 | Omori | G06T 5/50 |
| 10,897,620 | B2* | 1/2021 | Xing | H04N 19/136 |
| 2006/0285025 | A1* | 12/2006 | Yoshida | H04N 9/3194 |
| | | | | 349/8 |
| 2013/0212053 | A1* | 8/2013 | Yagi | G06K 9/6229 |
| | | | | 706/31 |
| 2014/0363088 | A1* | 12/2014 | Cha | G06F 16/5838 |
| | | | | 382/195 |
| 2015/0302275 | A1* | 10/2015 | Liao | G06K 9/00912 |
| | | | | 348/222.1 |
| 2016/0141213 | A1 | 5/2016 | Bishop et al. | |
| 2017/0214005 | A1 | 7/2017 | Qian et al. | |
| 2018/0348792 | A1* | 12/2018 | O'Brien | G05D 1/0088 |
| 2021/0166060 | A1* | 6/2021 | Wang | G06K 9/6202 |

FOREIGN PATENT DOCUMENTS

| | | |
|---|---|---|
| CN | 102253506 A | 11/2011 |
| CN | 102262093 A | 11/2011 |
| CN | 102601131 A | 7/2012 |
| CN | 203191327 U | 9/2013 |
| CN | 104659071 A | 5/2015 |
| CN | 105371955 A | 3/2016 |
| CN | 107004616 A | 8/2017 |
| CN | 109000887 A | 12/2018 |
| JP | 2015-194318 A | 11/2015 |

OTHER PUBLICATIONS

Chinese Office Action in Chinese Application No. 201810517710.X, dated Oct. 25, 2019 with English translation.

* cited by examiner

METHOD AND APPARATUS FOR IMAGE DETECTION, PATTERNING CONTROL METHOD

This application is the National Stage of PCT/CN2019/088146 filed on May 23, 2019, which claims priority under 35 U.S.C. § 119 of Chinese Application No. 201810517710.X filed on May 25, 2018, the disclosure of which is incorporated by reference.

TECHNICAL FIELD

The present disclosure relates to the field of displaying technique, and more particularly, to an image detection method, an image detection apparatus, an image detection device, a medium, a patterning control system and method.

BACKGROUND

TFT-LCD display device is a flat display apparatus that relies on a backlight module assembly to provide backlight, and uses a display panel to modulate the backlight so as to achieve image displaying, it has a good display effect.

At present, main components of the TFT-LCD display device are generally made with a patterning technology such as photolithography. In the case of external interference, there may be deviations in patterning accuracy, resulting in a poor quality of the manufactured TFT-LCD display device. Thus, after the complete production of the layer image by patterning technology, a manual inspection manner is required to perform qualitative inspection on the produced layer image so as to determine that accuracy of the produced pattern image meets the needs. However, due to individual differences, results of the same layer image by different manual detections are different, and accuracy of the produced pattern image cannot be quantified, resulting in inconsistent detection standards.

SUMMARY

The purpose of the present disclosure is to provide an image detection method, an image detection apparatus, an image detection device, a medium, and a patterning control system and method, so as to make the detection of the accuracy of the pattern image obtained by the patterning technology more intelligent and accurate, and reduce the labor input cost.

According to an aspect of the present disclosure, there is provided an image detection method, including: identifying an input image to obtain feature data of the input image; comparing the image feature data with preset image feature data in a preset image feature database to obtain deviation data of the input image; wherein the input image is a pattern image of a patterned structure.

In some embodiments, identifying an input image to obtain image feature data of the input image includes: positioning a target in the input image to get a target positioning result; performing image segmentation on the input image based on the target positioning result, to obtain a local area image that comprises at least the target; extracting image features of the local area image, and obtaining the image feature data based on the image features.

In some embodiments, comparing the image feature data with preset image feature data in a preset image feature database to obtain deviation data of input image includes: determining, based on the image feature data, an image type corresponding to the image feature data; obtaining preset image feature data corresponding to the image type in a preset image feature database, and using the preset image feature data as reference feature data; comparing the image feature data with the reference feature data, and calculating deviation data of the image feature data with respect to the reference feature data.

In some embodiments, the preset image feature database comprises at least one preset image feature data, and wherein: for a preset image in the image database, the preset image is identified, image feature data of the preset image is obtained and used as the preset image feature data.

In some embodiments, further comprising performing pre-processing on the input image before identifying the input image, wherein the pre-processing comprises at least one of image color space conversion, image noise filtering, and image morphology processing.

According to an aspect of the present disclosure, there is provided an image detection apparatus, comprising: an image identification unit configured to identify an input image and obtain image feature data of the input image; a deviation calculation unit configured to compare the image feature data with preset image feature data in a preset image feature database to obtain deviation data of the input image; wherein the input image is a pattern image of a patterned structure.

In some embodiments, the image identification unit comprises: a target positioning module configured to position a target in the input image and obtain a target positioning result; an image segmentation module configured to perform image segmentation on the input image to obtain a local area image based on the target positioning result, the local area image comprising at least the target; a feature data generation module configured to extract image features of the local area image and generate image feature data based on the image features.

In some embodiments, the deviation calculation unit comprises: an image type determination module configured to determine, based on the image feature data, an image type corresponding to the image feature data; a reference feature data determination module configured to obtain preset image feature data corresponding to the image type in a preset image feature database, and use the preset image feature data as the reference feature data; a deviation data generation module configured to compare the image feature data with the reference feature data, and calculate deviation data of the image feature data with respect to the reference feature data.

In some embodiments, the preset image feature database comprises at least one preset image feature data, and wherein: for a preset image in the image database, the preset image is identified, image feature data of the preset image is obtained and used as the preset image feature data.

In some embodiments, the image detection apparatus further comprises a pre-processing unit configured to perform pre-processing on the input image, the pre-processing comprising at least one of image color space conversion, image noise filtering, and image morphology processing.

According to an aspect of the present disclosure, there is provided an image detection device, wherein the device comprises a processor and a memory, the memory containing a set of instructions that, when executed by the processor, causes the image detection device to execute the method as previously described.

According to an aspect of the present disclosure, there is provided a computer-readable storage medium having stored thereon computer-readable instructions, the method as previously described is executed when executed by a computer.

According to an aspect of the present disclosure, there is provided a patterning control method, comprising: processing an input image to obtain image deviation data of the input image; obtaining a correction parameter based on the deviation data; controlling a patterning process of a patterned structure layer based on the correction parameter, wherein processing the input image to obtain the deviation data of the input image including: identifying the input image to obtain image feature data of the input image; comparing the image feature data with preset image feature data in a preset image feature database to obtain deviation data of the input image; wherein the input image is a pattern image of a patterned structure.

According to an aspect of the present disclosure, there is provided a patterning control system, comprising: an image detection apparatus configured to process an input image to obtain deviation data of the input image, and output the deviation data; a cloud server configured to receive the deviation data from the image detection apparatus, obtain a correction parameter based on the deviation data, and control a patterning process of a patterned structure layer according to the correction parameter, wherein the image detection apparatus is configured to process the input image to obtain deviation data of the input image according to the method as previously described.

BRIEF DESCRIPTION OF THE DRAWINGS

The drawings described herein are used to provide a further understanding of the present disclosure and constitute a part of the present disclosure. The exemplary embodiments of the present disclosure and the description thereof are used to explain the present disclosure, rather than constituting an improper limitation on the present disclosure.

In the drawings.

DETAILED DESCRIPTION OF THE EMBODIMENTS

The technical solutions in the embodiments of the present disclosure will be clearly and completely described below with reference to the accompanying drawings in the embodiments thereof. Obviously, the described embodiments are only a part of the embodiments of the present disclosure, not all of the embodiments. All other embodiments obtained by a person skilled in the art based on the embodiments in the present disclosure without creative effort belong to the protection scope of the present disclosure.

Existing manual detection on the pattern image of the patterned structure requires a long time and dedicated effort of the staff to perform detection and recognition, and the human eye can easily cause visual fatigue and attention decrease after a long time staring at a variety of monitoring screens, which leads to poor detection reliability, brings hidden dangers to product quality, at the same time also makes the labor cost of detecting pattern images too large.

Figure 1:
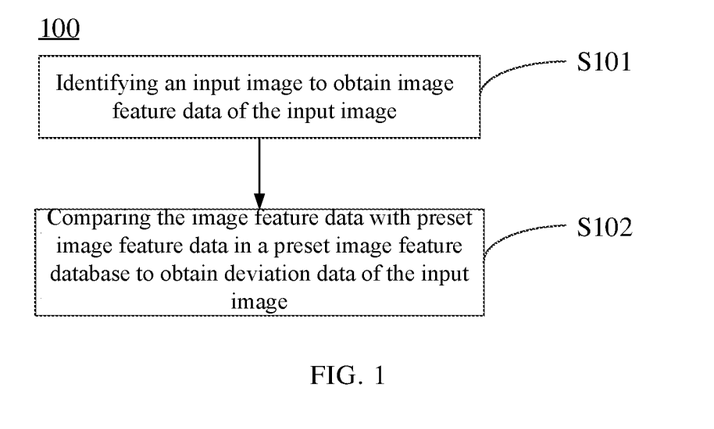
FIG. 1 shows a flowchart of an image detection method 100 according to an embodiment of the present disclosure.

FIG. 1 is a flowchart of an image detection method 100 according to an embodiment of the present disclosure.

Referring to FIG. 1, an embodiment of the present disclosure provides an image detection method 100. The image detection method 100 comprises: first, in step S101, an input image is identified, to obtain image feature data of the input image. Second, in step S102, the image feature data is compared with preset image feature data in a preset image feature database to obtain deviation data of the input image.

The input image may be an image captured in real time by a camera or a video apparatus, or may be an image obtained in other ways in advance. The embodiment of the present disclosure is not limited by the source and acquisition method of the input image. For example, the image may be an image directly captured by a camera or the like, or may be an image obtained after being processed in advance by a computer.

The image feature data of the input image is data characterizing image features of the input image. For example, it can characterize the size, color, texture, and geometric features of the input image, or it can also characterize the graphic features of a target pattern existing in the input image. The image feature data may be, for example, a specific numerical value, or in the form of a vector, or may also be in the form of a matrix. The embodiment of the present disclosure is not limited by the specific image features characterized by the image feature data and the specific forms that the image feature data have.

For the process of comparing the image feature data with the preset image feature data in a preset image feature database, for example, it may be performed by comparing a data value of a specific data element in the image feature data with a corresponding data value in the preset image feature data, or by comparing the image feature data and the preset image feature data as a whole, for example, when the image feature data is in a vector form, a Hamming distance between the image feature data and the preset image feature data may be calculated to realize the comparison process. The embodiment of the present disclosure is not limited by the specific comparison modes.

The input image is a pattern image of a patterned structure.

The patterned structure is, for example, a structure obtained through a patterning technology. The patterning technology may be, for example, dry etching, wet etching, or other patterning methods. The embodiment of the present disclosure is not limited by the specific method of obtaining the patterned structure.

For example, the patterned structure may be a layer image of each layer of the thin film transistor after being patterned, such as a layer image of a gate insulating film (GI) of a thin film transistor, or a layer image of an active film (ACT) of a thin film transistor, etc., or it may also be a pattern image of other patterned structure, such as a pattern image of a semiconductor structure, an array substrate, and the like after being patterned. The embodiment of the present disclosure is not limited by the specific structure type of the patterned structure.

Based on the foregoing, according to the image detection method of the present disclosure, the image feature data of the input image is obtained by identifying the inputted pattern image of the patterned structure, and based on a comparison between the image feature data and preset image feature data in a preset image feature database, the deviation data of the input image is finally obtained, so that the deviation between the input image and the preset image can be obtained. Compared with the manual detection mode, it can achieve simple and fast intelligent detection on image accuracy of the input image, avoid the problem of excessive investment in human labor and time caused by manual detection; at the same time, it can improve the accuracy of image deviation detection and facilitate subsequent adjustment and processing of the input image based on the deviation.

In some embodiments, the preset image feature database includes at least one preset image feature data, and for a preset image in the image database, the preset image is identified to obtain image feature data of the preset image, which is used as the preset image feature data. Based on the foregoing, the preset image feature data and the image feature data of the input image are made to have the same data format, which facilitates subsequent comparison between the preset image feature data with the image feature data of the input image.

Figure 2A:
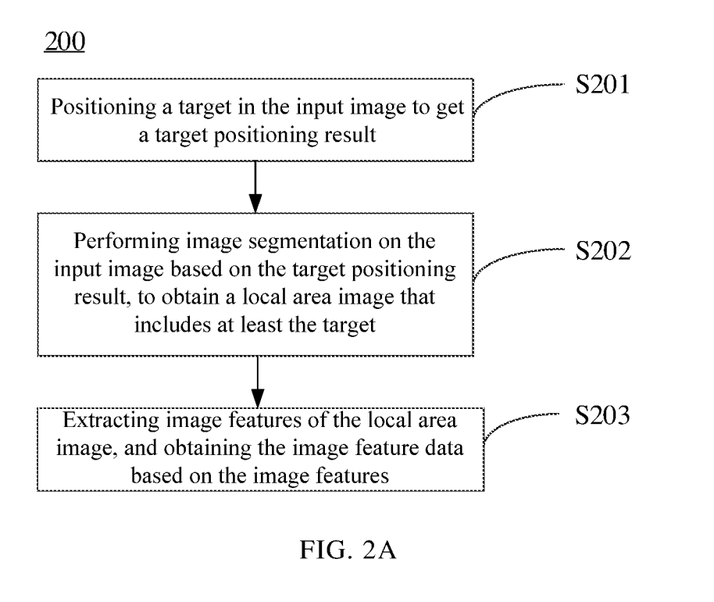
FIG. 2A shows a flowchart of identifying an input image to obtain image feature data 200 of the input image according to an embodiment of the present disclosure.

FIG. 2A shows a flowchart of a process 200 of identifying an input image to obtain image feature data of the input image according to an embodiment of the present disclosure.

As shown in FIG. 2A, identifying an input image to obtain image feature data of the input image includes: first, in step S201, a target in the input image is positioned to obtain a target positioning result.

Positioning a target in the input image may be achieved by pixel threshold comparison, for example, pixel values of pixels in the input image are compared with a preset pixel threshold, and a set of pixels having pixel values greater than the preset threshold is used as the target; or it may also be achieved by performing edge detection on the input image to identify a target in the input image, or it may also be implemented by a deep learning algorithm, such as a regional algorithm based on features of a convolutional neural network(R-CNN), a two-stage object detection algorithm such as Fast Region algorithm based on features of a convolutional neural network (Fast R-CNN). The embodiment of the present disclosure is not limited by the selected specific target positioning method.

The target positioning result may be represented by a coordinate vector, for example, for a target in an image, coordinates of four corner points of a rectangular region including the target and having the smallest area may be adopted, for example, offsets of the four corner points of the rectangular region with respect to the center point of the input image is used to represent its positioning result.

However, according to an embodiment of the present disclosure, the positioning result may also be a circular or irregular closed shape that surrounds the target and has the smallest area, the embodiment of the present disclosure makes no limitation to the representing manner of the positioning result.

The input image may include, for example, only one target, for example, if the input image is a picture of a gate insulating layer taken by a video-camera, the target included therein is a layer pattern of the gate insulating layer; or the input image may include, for example, multiple targets, for example, the input image is a photo of a thin film transistor taken by a video-camera and the thin film transistor is patterned to complete the substrate, the bottom gate layer, the channel layer, the source layer, and the drain layer, then the input image at this time includes multiple targets, which respectively are: the layer pattern of the substrate layer, the layer pattern of the bottom gate layer, the layer pattern of the channel layer, the layer pattern of the source layer, the layer pattern of the drain layer. The embodiment of the present disclosure makes no limitation to the number of targets in the input image and the target types thereof.

After obtaining the target positioning result, further, in step S202, based on the target positioning result, image segmentation is performed on the input image to obtain a local area image, wherein the local area image includes at least the target.

For example, when only one target is included in the image, the local area image may be, for example, an image including the target. When the image includes multiple targets, a local area image is obtained corresponding to each target, and the local area image includes the target. For example, when three targets are included, three local area images will be obtained after image segmentation, wherein each local area image includes one target. The embodiment of the present disclosure is not limited by the number of local area images obtained.

The local area image may be, for example, a rectangular image, or may be a circular image or an irregular image based on the specific shape of the target. The embodiment of the present disclosure makes no limitation to the shape and size of the local area.

After obtaining the local area image, in step S203, image features of the local area image are extracted, and image feature data is obtained based on the image features.

For example, when the input image is segmented to obtain one local area image, after feature extraction and processing are performed on the local area image, one image feature data corresponding to the local area image is obtained. If the input image is segmented to obtain multiple local area images, after performing feature extraction and processing on the input image, multiple image feature data can be obtained, wherein each image feature data corresponds to one corresponding local area image.

Specifically, for each local area image obtained, based on the different target included in the local area image, a different image feature extraction method may be selected. For example, extracting the image features of the local area image may be: inputting the local area image at an input layer of a convolutional neural network, and after processing by the convolutional layer, content features of the local area image can be obtained at a fully connected layer. The obtained content features may be a multi-dimensional feature vector, such as 2048-dimensional or 1024-dimensional, and the feature vector may be directly used as image feature data of the image. Alternatively, other methods can be used to extract the image features of the local area image, to extract shape features, color features, texture features, geometric features, and spatial features of the image separately, in this case, for example, what is obtained are multiple specific features, these multiple features need to be further processed, such as performing mathematically describing or processing on them to obtain feature data. The embodiment of the present disclosure is not limited by the selected image feature extraction method and the representing manner of the obtained image features.

In some embodiments, after obtaining the image features, for example, the image features may be processed according to a preset rule to obtain corresponding image feature data.

Figure 2B:
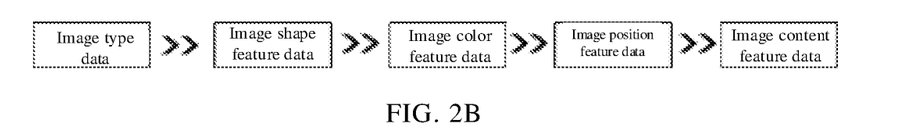
FIG. 2B shows a schematic diagram of formats of preset image feature data of an image detection method according to an embodiment of the present disclosure.
Figure 2C:
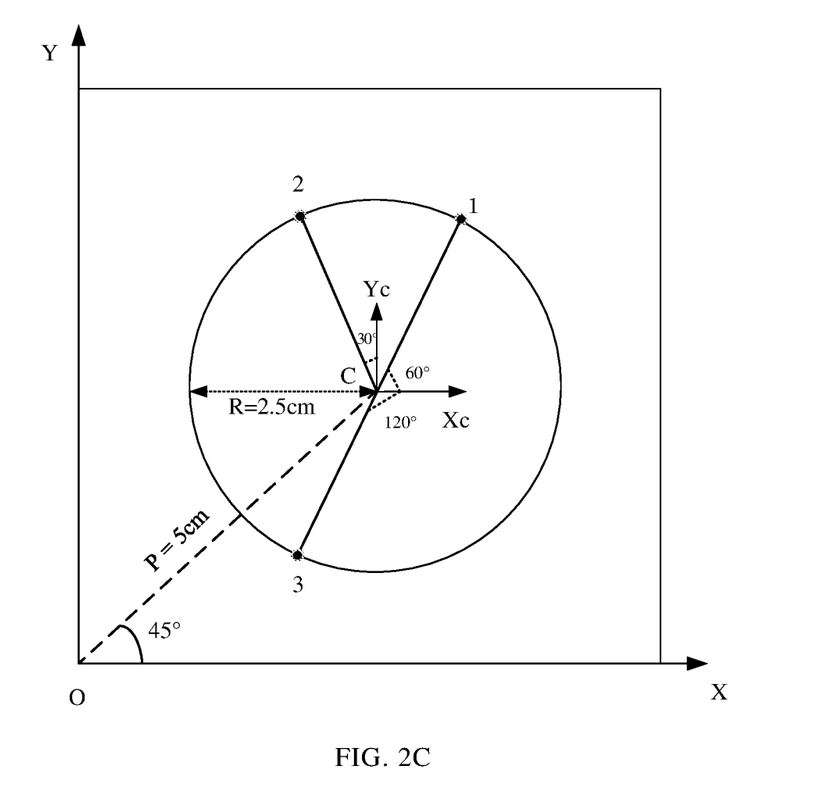
FIG. 2C shows a schematic diagram of an input image of an image detection method according to an embodiment of the present disclosure.

FIG. 2B shows a schematic diagram of formats of preset image feature data of an image detection method according to an embodiment of the present disclosure. FIG. 2C shows a schematic diagram of an input image of an image detection method according to an embodiment of the present disclosure.

Referring to FIG. 2B and FIG. 2C, the above-mentioned process of processing the image feature according to a preset rule to obtain corresponding image feature data can be described in more detail. For example, the order of formats of the preset image feature data is: image type data, image shape feature data, image color feature data, image position feature data, and image content feature data.

Further, the image type data indicates a type to which the image belongs, the image shape feature data includes, for example, shape type data representing a shape type of the target pattern in the image and image size data representing a size of the target pattern in the image, the unit of the image size data is cm; the image color feature data indicates a color category of the target pattern in the image, and its value is, for example, pixel values of the target pattern; the image position feature data indicates a position of the target pattern in the image, which includes, for example, distance position data and angular position data, wherein the angular position data is a counter-clockwise rotation angle of the center point of the target pattern relative to the X axis in the image, and the distance position data is a distance between the center point of the target pattern and the image origin O, the unit of the distance position data is cm; the image content feature data characterizes labeled points at an edge of the image, the value of which is for example, an angle value of the counter-clockwise rotation angle of each labeled point on the edge of the image with respect to the $X_c$ axis of the target pattern, and it is preset that five labeled points are included.

Based on the above, for the image data in FIG. 2C, if the current input image is a patterned substrate structure, then its corresponding image type is, for example, 2; when the shape of the target pattern in the extracted image is circular and its circle radius is 2.5 cm, then its shape type data is, for example, C (characterizing a circle) and its image size data is 2.5; its image color is white, its pixel value is 255, then its color feature data is 255; the center point is rotated 45 degrees counterclockwise with respect to the X axis of the image, then the data value of its angular position data is 45; the distance between the center point C of the target pattern in the image and the image origin O is 5 cm, then the data value of the image position data is 5. There are three labeled points 1, 2, and 3 on the edge of the circle, their counter-clockwise rotation angles with respect to the Xc axis of the target pattern are 60 degrees, 120 degrees, and 240 degrees respectively, then the five values included in the image content data thereof include data values 60, 120, and 240, and the rest of the data values are default (represented by 0 here). In summary, the attribute data obtained based on the above rule is (2, C, 2.5, 255, 45, 5, 60, 120, 240, 0, 0).

It should be understood that the above example is only used to explain the process of processing the image features to obtain corresponding image feature data according to a preset rule, and makes no limitation to the preset rule and the obtained image feature data. The obtained image feature data is different depending on a different input image and a different preset rule. For example, when the input image is a gate insulating layer of a thin film transistor, the obtained image feature data may be, for example, a multi-dimensional row vector, which is, for example, 2048-dimensional.

Based on the foregoing, by positioning the target in the input image, segmenting the image based on the positioning to obtain a local area image that includes a target, and further extracting image features of the local area image, the changes of image feature due to the background area in the image is effectively filtered, accuracy of the extracted image features is improved.

Figure 3:
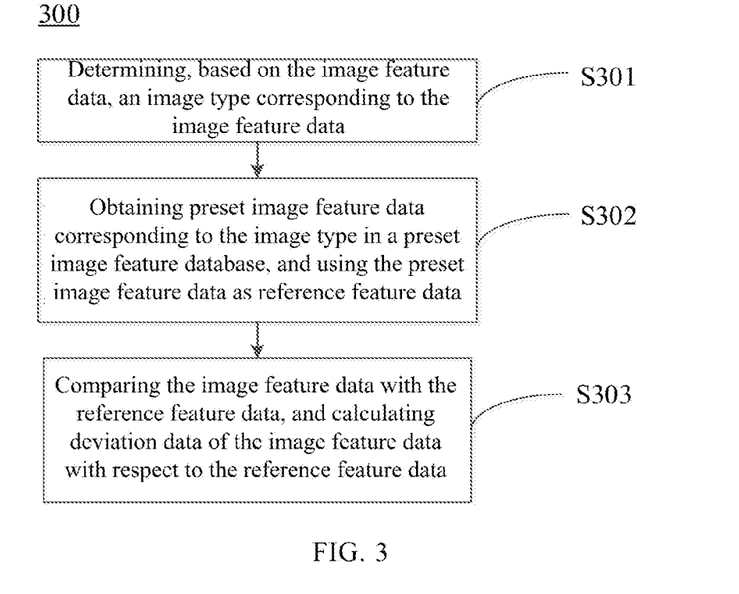
FIG. 3 shows a flowchart of the process 300 of obtaining deviation data of an input image by an image detection method according to an embodiment of the present disclosure.

FIG. 3 shows a flowchart of a process 300 of obtaining deviation data of an input image by an image detection method according to an embodiment of the present disclosure.

Referring to FIG. 3, in some embodiments, comparing the image feature data with preset image feature data in a preset image feature database to obtain deviation data of an input image includes: first, in step S301, based on the image feature data, an image type corresponding to the image feature data is determined.

The above process can be described more specifically. For example, when detecting the layer image of each patterned layer in the thin film transistor, the image feature data of each layer image includes, for example, image type data indicating a type of the layer to which the image belongs, at this time, an image type of the image can be determined based on the image type data. For example, the image type data 1 characterizes the image as a layer image of a gate insulating layer (GI) of the thin film transistor, and the image type data 2 characterizes the image as a layer image of an active layer (ACT) of the thin film transistor image.

Alternatively, the image type of the image may also be determined based on one or more data values contained in the image feature data. For example, a color feature threshold of the image can be set to [100, 200], when the color feature data value of the input image is less than 100, it is determined to be a first type; when the color feature data value of the input image is not less than 100 and not more than 200, it is determined to be a second type; and when the color feature data value of the input image is more than 300, it is determined to be a third type.

It should be understood that the foregoing embodiment is intended to explain the process of determining an image type corresponding to the image feature data based on the image feature data, and the embodiment of the present disclosure is not limited by the specific method adopted for the determined image type.

For example, when one image feature data is obtained after processing an input image, an image type corresponding to the image feature data is obtained accordingly; when multiple image feature data is obtained after processing the input image, for each of the multiple image feature data, its corresponding image type is determined. The embodiment of the present disclosure is not limited by the number of determined image types.

After obtaining the image type corresponding to the image feature data, in step S302, preset image feature data corresponding to the image type in a preset image feature database is obtained, and the preset image feature data is used as a reference feature data.

For example, when multiple image types are determined based on multiple image feature data, correspondingly, for each image type, preset image feature data corresponding to the type is obtained and used as reference feature data corresponding to the image type. The embodiment of the present disclosure is not limited by the number of obtained reference feature data.

After obtaining the reference data, in step S303, the image feature data is compared with the reference feature data, and deviation data of the image feature data with respect to the reference feature data is calculated.

Specifically, comparing the image feature data with the reference feature data may be implemented by classification comparison. For example, for each image feature type among preset image feature types, data values of the image feature data and the reference feature data corresponding to this image feature type are compared to obtain data deviation under this image feature type, then data deviation values of different image feature types are stitched together to obtain the final deviation data. However, it should be understood that the embodiment of the present disclosure is not limited by the specific comparison method employed.

Based on the foregoing, by determining an image type corresponding to the image feature data, determining corresponding reference feature data from a preset image feature database based on the image type, and further comparing the data with the reference feature data to obtain deviation data, the input image can be compared only with the reference feature data of the same image type. Compared with the method of comparing the image with each image in the preset reference database, the number of comparisons can be significantly reduced, thereby further improving the speed and efficiency of image detection.

In some embodiments, before identifying the input image, the method further comprises performing pre-processing on the input image. The preprocessing includes at least one of image color space conversion, image noise filtering, and image morphology processing.

Through the above pre-processing process, the noise in the input image can be effectively filtered and the initial color morphology adjustment can be performed on the input image, thereby facilitating the subsequent feature extraction process and improving the efficiency of image detection, at the same time, this process can further improve accuracy of the image detection results.

Figure 4:
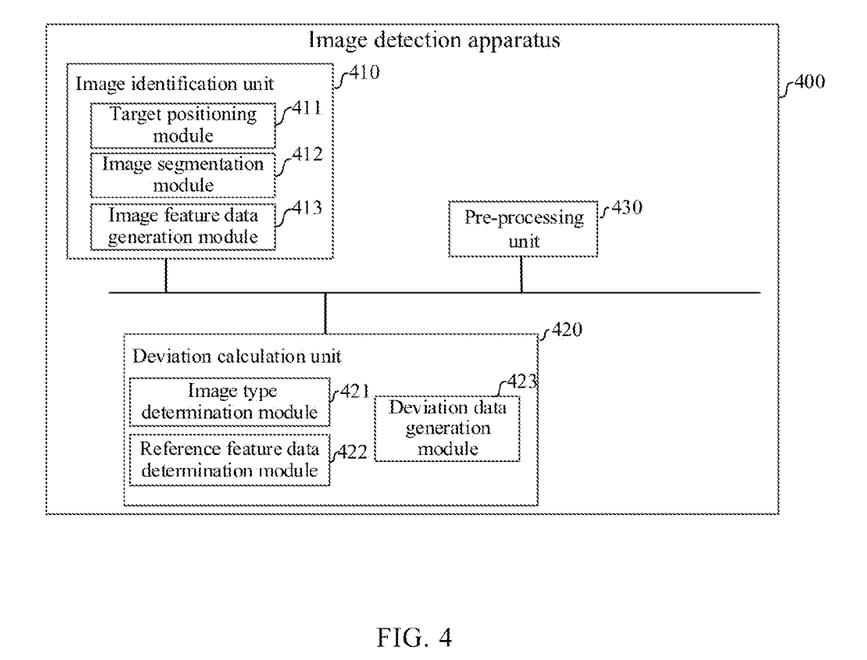
FIG. 4 shows a structural block diagram of an image detection apparatus 400 according to an embodiment of the present disclosure.

According to another aspect of the present disclosure, there is provided an image detection apparatus. FIG. 4 shows a structural block diagram of an image detection apparatus 400 according to an embodiment of the present disclosure.

As shown in the FIG. 4, the image detection apparatus 400 provided by the embodiment of the present disclosure comprises an image identification unit 410 and a deviation calculation unit 420, which can execute the method shown in FIG. 1.

The image identification unit 410 is configured to identify an input image and obtain image feature data of the input image; the deviation calculation unit 420 is configured to compare the image feature data with preset image feature data in a preset image feature database to obtain deviation data of the input image; wherein the input image is a pattern image of a patterned structure.

The input image may be an image captured in real time by a camera or a video recording apparatus, or may be an image obtained in other ways in advance. The embodiment of the present disclosure is not limited by the source and acquisition method of the input image. For example, the image may be an image directly captured by a camera or the like, or may be an image obtained after being processed in advance by a computer.

The image feature data of the input image is data characterizing image features of the input image. For example, it can characterize the size, color, texture, and geometric features of the input image, or it can also characterize the graphic features of a target pattern existing in the input image. The image feature data may be, for example, a specific numerical value, or in the form of a vector, or may also be in the form of a matrix. The embodiment of the present disclosure is not limited by the specific image features characterized by the image feature data and the specific forms that the image feature data have.

For the process of comparing the image feature data with the preset image feature data in a preset image feature database, for example, it may be performed by comparing a data value of a specific data element in the image feature data with a corresponding data value in the preset image feature data, or by comparing the image feature data and the preset image feature data as a whole, for example, when the image feature data is in a vector form, a Hamming distance between the image feature data and the preset image feature data may be calculated to realize the comparison process. The embodiment of the present disclosure is not limited by the specific comparison modes.

The patterned structure is, for example, a structure obtained through a patterning technology. The patterning technology may be, for example, dry etching, wet etching, or other patterning methods. The embodiment of the present disclosure is not limited by the specific method of obtaining the patterned structure.

For example, the patterned structure may be a layer image of each layer of the thin film transistor after being patterned, such as a layer image of a gate insulating film (GI) of a thin film transistor, or a layer image of an active film (ACT) of a thin film transistor, etc., or it may also be a pattern image of other patterned structure, such as a pattern image of a semiconductor structure, an array substrate, and the like after being patterned. The embodiment of the present disclosure is not limited by the specific structure type of the patterned structure.

Based on the foregoing, according to the image detection apparatus of the present disclosure, the image feature data of the input image is obtained by identifying the inputted pattern image of the patterned structure by adopting the image identification unit, and based on a comparison between the image feature data and preset image feature data in a preset image feature database, deviation data of the input image is finally obtained in the derivation calculation unit, so that deviation of the input image relative to the preset image can be obtained. Compared with the manual detection mode, it can achieve simple and fast intelligent detection on image accuracy of the input image, avoid the problem of excessive investment in manpower and time caused by manual detection; moreover, since the image detection apparatus intelligently processes the pattern image of the patterned structure, its processing process is consistent with the standard, standard instability of manual qualitative detection is rid of. At the same time, the accuracy of image deviation detection can be improved, which is convenient for subsequent adjustment and processing on the input image based on the deviation.

In particular, in the process of producing the array substrate, the gate lines, data lines, pixel electrodes, as well as each layer of the thin film transistor and the vias between the layers are all produced by combined use of a film formation process and a patterning process. When the patterning of one layer is completed, the patterned layer can be detected by the image detection apparatus to determine whether the produced patterned layer meets the needs. For example, when the image detection apparatus provided in the embodiment of the present disclosure detects the opening position and the opening size of a via, it can measure center coordinates and via radius of the via and compare them with the center coordinates and radius of a standard via to judges accuracy of the measured center coordinates and radius of the via with a quantified standard.

In some embodiments, the preset image feature database includes at least one preset image feature data, and for a preset image in the image database, the preset image is identified to obtain image feature data of the preset image, which is used as the preset image feature data.

Based on the foregoing, the preset image feature data and the image feature data of the input image are made to have the same data format, which facilitates subsequent comparison between the preset image feature data with the image feature data of the input image.

In some embodiments, the image identification unit 410 includes a target positioning module 411, an image segmentation module 412, and an image feature data generation module 413, which can perform the method described in FIG. 2A.

The target positioning module 411 is configured to perform the operation of the step S201 in FIG. 2A, positioning a target in an input image to obtain a target positioning result.

The input image may for example include only one target, for example, if the input image is a picture of a gate insulating layer taken by a video-camera, the target included therein is a layer pattern of the gate insulating layer; or the input image may include, for example, multiple targets, for example, the input image is a photo of a thin film transistor taken by a video-camera and the thin film transistor is patterned at this time to complete the substrate, the bottom gate layer, the channel layer, the source layer, and the drain layer, then the input image at this time includes multiple targets, which respectively are: the layer pattern of the substrate layer, the layer pattern of the bottom gate layer, the layer pattern of the channel layer, the layer pattern of the source layer, the layer pattern of the drain layer. The embodiment of the present disclosure makes no limitation to the number of targets in the input image and the target types thereof.

Positioning a target in the input image may be achieved by pixel threshold comparison, for example, pixel values of pixels in the input image are compared with a preset pixel threshold, and a set of pixels having pixel values more than the preset threshold is used as the target; or it may also be achieved by using a preset standard (such as a specific color, a specific shape, etc.) to position the target., or it may also be implemented by a deep learning algorithm, such as a regional algorithm based on features of a convolutional neural network(R-CNN), a two-stage object detection algorithm such as fast regional algorithm Region based on features of a convolutional neural network (Fast R-CNN). The embodiment of the present disclosure is not limited by the selected specific target positioning method.

The target positioning result may be represented by a coordinate vector, for example, for a target in an image, coordinates of four corner points of a rectangular region including the target and having the smallest area may be adopted, for example, offsets of the four corner points of the rectangular region with respect to the center point of the input image are used to represent its positioning result. However, according to an embodiment of the present disclosure, the positioning result may also be a circular or irregular closed shape that surrounds the target and has the smallest area, the embodiment of the present disclosure makes no limitation to the representing manner of the positioning result.

The image segmentation module 412 is configured to perform the operation of step S202 in FIG. 2A, performing image segmentation on the input image based on the target positioning result, to obtain a local area image that includes at least the target.

The above data segmentation methods are various, such as a pixel threshold-based segmentation method, an edge-based segmentation method, a region-based segmentation method, and an energy function-based segmentation method, these segmentation methods can be used alone or in combination, the specific used method is related to characteristics of the layer image data.

As for the pixel threshold-based segmentation method, it is a traditional region-based image segmentation technique, which is particularly suitable for images where the target and background occupy different gray-scale ranges. Specifically, the pixel threshold-based segmentation method is to divide the image pixel set according to the gray level, there are consistent attributes inside each region, and adjacent regions do not have such consistent attributes, so that the image of the local area where the target resides is obtained.

As for the edge-based segmentation method, it relies on finding the edge of the target region in the image by an edge detection operator to complete image segmentation. Specifically, the edge-based segmentation method first uses an appropriate edge detection operator to extract the boundary of different regions of the scene to be segmented, and then connects and labels the pixels within the segmented boundary, thereby constituting segmented regions.

As for the region-based segmentation method, it refers to dividing the data to be analyzed into regions, extracting region fragments in which the target is located for further processing, and discarding other data to reduce the data amount of subsequent processing.

The energy function-based segmentation method has good characteristics, it establishes a mathematical model and converts the segmentation problem into a mathematical optimization problem, it can clearly describe the problem to be solved, and it is separated from the algorithm for solving the problem.

For example, when only one target is included in the image, the local area image may be, for example, an image including the target. When the image includes multiple targets, a local area image is obtained corresponding to each target, and the local area image includes the target. For example, when three targets are included, three local area images will be obtained after image segmentation, wherein each local area image includes one target. The embodiment of the present disclosure is not limited by the number of local area images obtained.

The local area image may be, for example, a rectangular image, or may be a circular image or an irregular image based on the specific shape of the target. The embodiment of the present disclosure makes no limitation to the shape and size of the local area.

The image feature data generation module 413 is configured to perform the operation shown in step S203 in FIG. 2A, extracting image features of the local area image, and obtaining the image feature data based on the image features.

For example, when the input image is segmented to obtain one local area image, after feature extraction and processing are performed on the local area image, one image feature data corresponding to the local area image is obtained. If the input image is segmented to obtain multiple local area images, after performing feature extraction and processing on the input image, multiple image feature data can be obtained, wherein each image feature data corresponds to one corresponding local area image.

For example, extracting the image features of the local area image may be inputting the local area image at an input layer of a convolutional neural network, and after processing by the convolutional layer, content features of the local area image can be obtained at a fully connected layer. Alternatively, other methods can be used to extract the image features of the local area image, to extract shape features, color features, texture features, geometric features, and spatial features of the image separately. The embodiment of the present disclosure is not limited by the selected image feature extraction method and the representing manner of the obtained image feature.

In some embodiments, after obtaining the image features, for example, the image features may be processed according to a preset rule, for example, they may be mathematically described or processed to obtain feature data. The corresponding image feature data can be obtained.

Based on the foregoing, by positioning the target in the input image, segmenting the image based on the positioning to obtain a local area image that includes a target, and further extracting image features for the local area image, image feature transformation due to the background area in the image is effectively filtered, accuracy of the extracted image features is improved.

In some embodiments, the deviation calculation unit 420 includes an image type determination module 421, a reference feature data determination module 422, and a deviation data generation module 423, which can perform the method shown in FIG. 3.

The image type determination module 421 is configured to perform an operation as shown in step S301 in FIG. 3, determining, based on the image feature data, an image type corresponding to the image feature data.

For example, when one image feature data is obtained after processing an input image, an image type corresponding to the image feature data is obtained accordingly; when multiple image feature data is obtained after processing the input image, for each of the multiple the image feature data, its corresponding image type is determined. The embodiment of the present disclosure is not limited by the number of determined image types.

The reference feature data determination module 422 is configured to perform an operation as shown in step S302 in FIG. 3, the reference feature data determination module is configured to obtain preset image feature data corresponding to the image type in a preset image feature database, and use the preset image feature data as the reference feature data.

For example, when multiple image types are determined based on multiple image feature data, correspondingly, for each image type, preset image feature data corresponding to the type is obtained and used as reference feature data corresponding to the image type. The embodiment of the present disclosure is not limited by the number of obtained reference feature data.

The deviation data generation module 422 is configured to perform an operation as shown in step S303 in FIG. 3, comparing the image feature data with preset image feature data in a preset image feature database to obtain deviation data of the input image.

Specifically, comparing the image feature data with the reference feature data may be implemented by classification comparison. For example, for each image feature type among preset image feature types, data values of the image feature data and the reference feature data corresponding to this image feature type are compared to obtain data deviation under this image feature type, then data deviation values of different image feature types are stitched together to obtain the final deviation data. However, it should be understood that the embodiment of the present disclosure is not limited by the specific comparison method employed.

Based on the foregoing, by determining an image type corresponding to the image feature data, determining corresponding reference feature data from a preset image feature database based on the image type, and further comparing the data with the reference feature data to obtain deviation data, the input image can be compared only with the reference feature data of the same image type. Compared with the method of comparing the image with each image in the preset reference database, the number of comparisons can be significantly reduced, thereby further improving the speed and efficiency of image detection.

In some embodiments, the image detection apparatus further comprises a pre-processing unit 430 configured to perform pre-processing on the input image, the pre-processing including at least one of image color spatial conversion, image noise filtering, and image morphology processing.

Through the pre-processing unit 430, the noise in the input image can be effectively filtered and the initial color morphology adjustment can be performed on the input image, thereby facilitating the subsequent feature extraction process and improving the efficiency of image detection, at the same time, this process can further improve accuracy of the image detection results.

Figure 5:
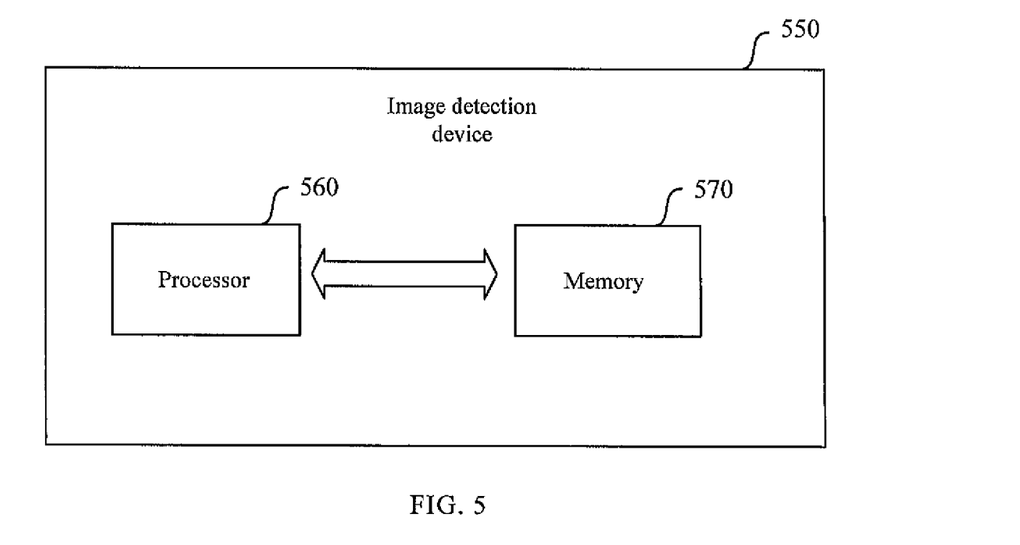
FIG. 5 shows a structural block diagram of an image detection device 550 according to an embodiment of the present disclosure.

According to another aspect of the present disclosure, there is further provided an image detection device 550.

The image detection device 550 as shown in FIG. 5 may be implemented as one or more dedicated or general purpose computer system modules or components, such as a personal computer, a notebook computer, a tablet computer, a mobile phone, a personal digital assistance (PDA), and any smart portable device. The image detection device 550 may include at least one processor 560 and a memory 570.

The at least one processor is configured to execute program instructions. The memory 570 may be present in the image detection device 550 in different forms of program storage units and data storage units, such as a hard disk, a read only memory (ROM), a random access memory (RAM), it can be used for storing various data files used during processor processing and/or in the process of executing image detection, as well as possible program instructions executed by the processor. Although not shown in the figures, the image detection device 550 may also include an input/output component that supports input/output data streams between the image detection device 550 and other components (such as an image acquisition device). The image detection device 550 may also transmit and receive information and data from a network via a communication port.

In some embodiments, a set of instructions stored by the memory 570, when executed by the processor 560, causes the image detection device 550 to execute operations comprising: identifying an input image to obtain image feature data of the input image; comparing the image feature data with preset image feature data in a preset image feature database to obtain deviation data of the input image; wherein the input image is a pattern image of a patterned structure.

In some embodiments, comparing the image feature data with preset image feature data in a preset image feature database to obtain deviation data of input image comprises: determining, based on the image feature data, an image type corresponding to the image feature data; obtaining preset image feature data corresponding to the image type in a preset image feature database, and using the preset image feature data as reference feature data; comparing the image feature data with the reference feature data, and calculating deviation data of the image feature data with respect to the reference feature data.

In some embodiments, the image detection device 550 can receive images acquired from an image acquisition device external to the image detection device 550, and perform the image detection method described above on the received image data to implement the functions of the image detection device described above.

The image acquisition device may be, for example, an industrial camera or a monitoring device.

Although the processor 560 and the memory 570 are presented as separate modules in FIG. 5, a person skilled in the art can understand that the above device modules may be implemented as separate hardware devices, or may be also integrated into one or more hardware devices. The specific implementation of different hardware devices should not be taken as factors for limiting the scope of the present disclosure, as long as the principles of the present disclosure can be implemented.

According to another aspect of the present disclosure, there is also provided a non-volatile computer-readable storage medium having stored thereon computer-readable instructions that, when executed by a computer, perform the method as described above.

Program portions of the technology may be considered to be "product" or "article" that exists in the form of executable codes and/or related data, which are embodied or implemented by a computer-readable medium. A tangible, permanent storage medium may include an internal memory or a storage used by any computers, processors, or similar devices or associated modules. For example, various semiconductor memories, tape drivers, disk drivers, or any similar devices capable of providing storage functionality for software.

All software or parts of it may sometimes communicate over a network, such as the internet or other communication networks. Such communication can load software from one computer device or processor to another. For example, loading from one server or host computer to a hardware environment of one computer environment, or other computer environment implementing the system, or a system having a similar function associated with providing information needed for image detection. Therefore, another medium capable of transmitting software elements can also be used as a physical connection between local devices, such as light waves, electric waves, electromagnetic waves, etc., to be propagated through cables, optical cables, or air. Physical medium used for carrying the waves such as cables, wireless connections, or fiber optic cables can also be considered as medium for carrying the software. In usage herein, unless a tangible "storage" medium is defined, other terms referring to a computer or machine "readable medium" mean a medium that participates in execution of any instruction by the processor.

Figure 6:
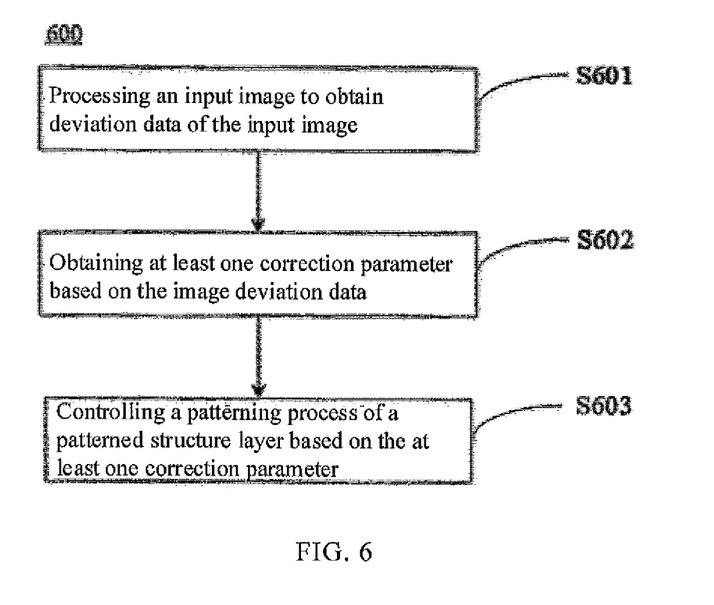
FIG. 6 shows a flowchart of a patterning control method 600 according to an embodiment of the present disclosure.

According to another aspect of the present disclosure, there is further provided a patterning control method, FIG. 6 shows a flowchart of a patterning control method 600 according to an embodiment of the present disclosure.

Referring to FIG. 6, the patterning control method 600 comprises: in step S601, processing an input image to obtain deviation data of the input image; in step S602, obtaining at least one correction parameter based on the deviation data; in step S603, controlling a patterning process of a patterned structure layer based on the at least one correction parameter.

As for the process of obtaining the correction parameter(s) based on the deviation data, it may be for example, obtaining the corresponding correction parameter(s) corresponding to the deviation data through correspondence between the deviation data and the technological parameter(s), or obtaining the corresponding correction parameter(s) by further processing the obtained deviation data through a preset function. The embodiment of the present disclosure is not limited by the specific method of obtaining the correction parameter(s) and the specific value of the correction parameter(s).

Controlling the patterning process of the patterned structure based on the correction parameter(s) may be, for example, adding the correction parameter(s) to the original technological parameter(s) to obtain new technological parameter(s); or performing a pattern correction process based on the correction parameter(s) after the original patterning process.

The embodiment of the present disclosure is not limited by the specific action mode of the correction parameter(s).

Based on the foregoing, by obtaining the deviation data of the input image, obtaining the correction parameter(s) according to the deviation data, and using the correction parameter(s) to control the patterning process of the patterned structure, the patterning control system controls production of the patterned structure in a closed-loop manner, so that the patterned structure with poor pattern image accuracy can be found as early as possible and re-produced, thereby reducing the manufacturing cost of the multilayer patterned structure. It can be seen that the patterning control system provided by the embodiment of the present disclosure can perform intelligent closed-loop control and patterning production process, and has good real-time performance.

In some embodiments, processing an input image to obtain image deviation data comprises: first, identifying an input image and obtaining image feature data of the input image; next, comparing the image feature data with preset image feature data in a preset image feature database to obtain deviation data of the input image; wherein the input image is a pattern image of a patterned structure.

Figure 7:
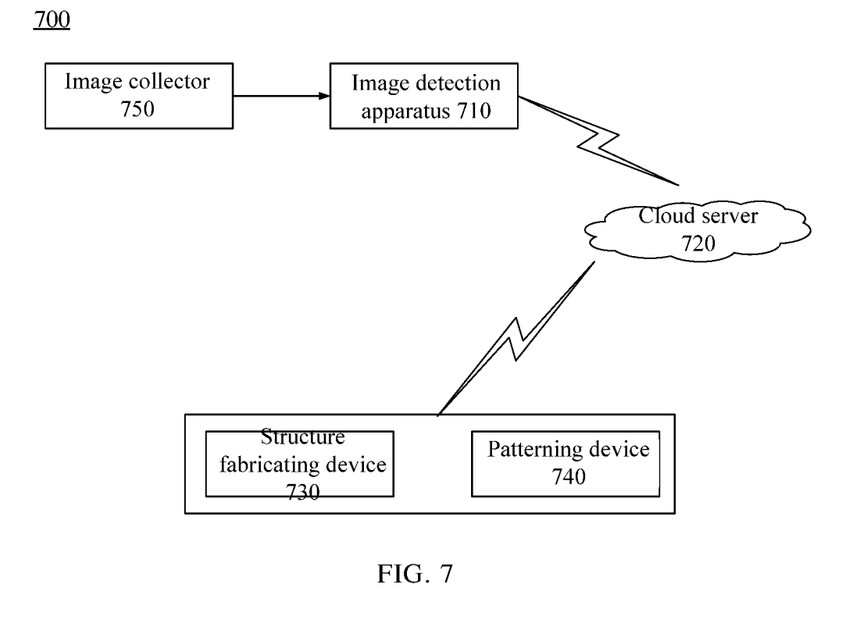
FIG. 7 shows a structural block diagram of a patterning control system 700 according to an embodiment of the present disclosure.

According to another aspect of the present disclosure, there is further provided a patterning control system 700, the system 700 comprises an image detection apparatus 710 and a cloud server 720, which can execute the method shown in FIG. 6.

The image detection apparatus 710 is configured to perform the operation of step S601 in FIG. 6, processing an input image to obtain deviation data of the input image, and outputting the deviation data.

The cloud server 720 is configured to perform the operations of steps S602 and S603 in FIG. 6, receiving image deviation data from the detection apparatus, obtaining at least one correction parameter based on the deviation data, and controlling a patterning process of a patterned structure layer according to the at least one correction parameter.

In specific implementation, the image detection apparatus 710 is configured to receive a pattern image collected by an image collector 750, and the cloud server 720, for example, sends the technological correction parameter(s) to a structure fabricating device 730 and a patterning device 740, thereby controlling the structure fabricating device 730 to re-structure, and controlling the patterning device 740 to re-pattern the structure.

Specifically, for example, detection of a layer image of a patterned layer of a transistor thin film will be described as an example. At this time, the detection system comprises an image collector, a cloud server, a pattern detection apparatus, a layer forming device (a device for producing a layer structure), and a patterning device. The image collector collects the layer image of the patterned layer formed by the patterning device, the layer image is analyzed by using the pattern detection apparatus to obtain layer deviation data that characterizes accuracy of the layer pattern, the pattern detection apparatus uploads the layer deviation data to the cloud server; the cloud server processes the deviation of the layer pattern detected by the pattern detection apparatus according to the relationship between the layer deviation data and the technological parameter(s) to obtain the correction parameter(s); the cloud server further sends the correction parameter(s) to the layer forming device for layer producing and the patterning device, so as to perform re-formation and perform layer patterning.

The relationship between the layer deviation data and the technological parameter(s) used by the cloud server, for example, is correspondence between the layer deviation data and patterning technological parameter(s) as established through big data analysis (such as machine learning, neural network and other algorithms) on the historical technological parameter(s) of the patterned layer and the pattern accuracy of the patterned layer. In addition, when the pattern detection apparatus uploads the layer deviation data to the cloud server, the cloud server also collects the current patterning technological parameter(s) possessed by the patterned layer as detected by the pattern detection apparatus to use as part of big data analysis.

In the patterning control system provided based on the present disclosure, image deviation data of an input image is obtained through the image detection apparatus, the correction parameter(s) can be obtained according to the deviation data by the cloud server, and the patterning process of the patterned structure is controlled using the correction parameter(s), so that the patterning control system controls production of the patterned structure in a closed-loop manner, so as to find the patterned structure with poor pattern image accuracy as early as possible and make re-production, thereby reducing production cost of the multilayer patterned structure. It can be seen that the patterning control system provided by the embodiment of the present disclosure can perform intelligent closed-loop control and patterning production process, and has good real-time performance.

In some embodiments, the image detection apparatus comprises: an image identification unit configured to identify an input image and obtain image feature data of the input image; a deviation calculation unit configured to compare the image feature data with preset image feature data in a preset image feature database to obtain deviation data of the input image; wherein the input image is a pattern image of a patterned structure.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the embodiments of the present disclosure and other embodiments are intended to be included in the scope of the attached claims. The present disclosure is defined by the claims and their equivalents.

What is claimed is:

1. An image detection method, comprising:
   identifying an input image to obtain image feature data of the input image;
   comparing the image feature data with preset image feature data in a preset image feature database to obtain deviation data of the input image;
   wherein the input image is a pattern image of a patterned structure, the pattern image of the patterned structure comprising a layer image of each layer of a thin film transistor after being patterned or comprising a pattern image of a semiconductor structure or an array substrate.

2. The image detection method according to claim 1, wherein identifying an input image to obtain image feature data of the input image comprises:
   positioning a target in the input image to get a target positioning result;
   performing image segmentation on the input image based on the target positioning result, to obtain a local area image that comprises at least the target;
   extracting image features of the local area image, and obtaining the image feature data based on the image features.

3. The image detection method according to claim 1, wherein comparing the image feature data with preset image feature data in a preset image feature database to obtain deviation data of input image comprises:
   determining, based on the image feature data, an image type corresponding to the image feature data;
   obtaining preset image feature data corresponding to the image type in a preset image feature database, and using the preset image feature data as reference feature data;
   comparing the image feature data with the reference feature data, and calculating deviation data of the image feature data with respect to the reference feature data.

4. The image detection method according to claim 1, wherein the preset image feature database comprises at least one preset image feature data, and wherein:
for a preset image in the image database, the preset image is identified, image feature data of the preset image is obtained and used as the preset image feature data.

5. The image detection method according to claim 1, further comprising performing pre-processing on the input image before identifying the input image, wherein the pre-processing comprises at least one of image color space conversion, image noise filtering, and image morphology processing.

6. A patterning control method, comprising:
processing an input image to obtain image deviation data of the input image;
obtaining a correction parameter based on the deviation data;
controlling a patterning process of a patterned structure layer based on the correction parameter;
wherein processing the input image to obtain the deviation data of the input image comprising:
identifying the input image to obtain image feature data of the input image;
comparing the image feature data with preset image feature data in a preset image feature database to obtain deviation data of the input image;
wherein the input image is a pattern image of a patterned structure, the pattern image of the patterned structure comprising a layer image of each layer of a thin film transistor after being patterned or comprising a pattern image of a semiconductor structure or an array substrate.

7. An image detection apparatus, comprising:
an image identification unit configured to identify an input image and obtain image feature data of the input image;
a deviation calculation unit configured to compare the image feature data with preset image feature data in a preset image feature database to obtain deviation data of the input image;
wherein the input image is a pattern image of a patterned structure, the pattern image of the patterned structure comprising a layer image of each layer of a thin film transistor after being patterned or comprising a pattern image of a semiconductor structure or an array substrate.

8. The image detection apparatus according to claim 7, wherein the image identification unit comprises:
a target positioning module configured to position a target in the input image and obtain a target positioning result;
an image segmentation module configured to perform image segmentation on the input image to obtain a local area image based on the target positioning result, the local area image comprising at least the target;
a feature data generation module configured to extract image features of the local area image and generate image feature data based on the image features.

9. The image detection apparatus according to claim 7, wherein the deviation calculation unit comprises:
an image type determination module configured to determine, based on the image feature data, an image type corresponding to the image feature data;
a reference feature data determination module configured to obtain preset image feature data corresponding to the image type in a preset image feature database, and use the preset image feature data as the reference feature data;
a deviation data generation module configured to compare the image feature data with the reference feature data, and calculate deviation data of the image feature data with respect to the reference feature data.

10. The image detection apparatus according to claim 7, wherein the preset image feature database comprises at least one preset image feature data, and wherein:
for a preset image in the image database, the preset image is identified, image feature data of the preset image is obtained and used as the preset image feature data.

11. The image detection apparatus according to claim 7, wherein the image detection apparatus further comprises a pre-processing unit configured to perform pre-processing on the input image, the pre-processing comprising at least one of image color space conversion, image noise filtering, and image morphology processing.

* * * * *